US011628507B2

(12) United States Patent
Kingsbury

(10) Patent No.: US 11,628,507 B2
(45) Date of Patent: Apr. 18, 2023

(54) FASTENING COLLAR REMOVAL APPARATUS, METHODS OF MAKING A FASTENING COLLAR REMOVAL APPARATUS, AND METHODS OF REMOVING A FASTENING COLLAR SECURED TO A FASTENER

(71) Applicant: HOWMET AEROSPACE INC., Pittsburgh, PA (US)

(72) Inventor: Thomas R. Kingsbury, Waco, TX (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 0 days.

(21) Appl. No.: 17/420,729

(22) PCT Filed: Feb. 28, 2019

(86) PCT No.: PCT/US2019/020005
§ 371 (c)(1),
(2) Date: Jul. 6, 2021

(87) PCT Pub. No.: WO2020/176099
PCT Pub. Date: Sep. 3, 2020

(65) Prior Publication Data
US 2022/0105579 A1 Apr. 7, 2022

(51) Int. Cl.
*B23D 29/00* (2006.01)
(52) U.S. Cl.
CPC .................. *B23D 29/007* (2013.01)
(58) Field of Classification Search
CPC ........... B23D 29/007; A61C 7/02; A61C 3/00; A61B 17/8891; B23B 13/48; B25B 27/18; B25C 11/02; B21J 15/50; B26B 17/00

(Continued)

(56) References Cited

U.S. PATENT DOCUMENTS 2,688,185 A * 9/1954 Brazil ................... B25D 3/00
30/167.2
2,836,888 A 6/1958 Hargrove
(Continued)

FOREIGN PATENT DOCUMENTS

GB 2154922 A 9/1985
GB 2180180 A * 9/1985 ........... B23D 29/007

OTHER PUBLICATIONS

International Search Report and Written Opinion of the International Search Authority for International Application No. PCT/US2019/020005 dated Nov. 27, 2019.

*Primary Examiner* — Ghassem Alie
(74) *Attorney, Agent, or Firm* — K&L Gates LLP

(57) ABSTRACT

Fastening collar removal apparatus, methods of making fastening collar removal apparatus, and methods of removing a fastening collar secured to a fastener are provided. A fastening collar removal apparatus includes a collet including a first section including a substantially cylindrical shape and a second section operatively coupled to the first section. The second section includes a collet cavity extending therein. The collet cavity is configured to receive at least a portion of a collar. The second section includes at least two fingers formed by at least two axial channels in the second section. At least one of the at least two fingers includes a blade extending inwardly relative to a longitudinal axis of the collet. In an open configuration of the collet, each of the at least two fingers includes an outward taper relative to a longitudinal axis of the collet.

21 Claims, 10 Drawing Sheets

(58) Field of Classification Search
USPC ......... 30/175, 180, 228; 29/426.4, 261, 413, 29/426.5, 414, 262, 265; 81/55, 112, 81/90.3, 53.2; 433/141; 606/104
See application file for complete search history.

(56) References Cited

U.S. PATENT DOCUMENTS

| | | | | |
|---|---|---|---|---|
| 2,853,723 | A * | 9/1958 | Winslow | B21J 15/50 30/168 |
| 3,000,097 | A * | 9/1961 | Hartz | B25D 3/00 83/13 |
| 4,627,155 | A * | 12/1986 | Mancabelli | B23P 19/022 29/283 |
| 4,704,793 | A * | 11/1987 | Lockey | B23D 29/007 30/187 |
| 5,667,513 | A * | 9/1997 | Torrie | A61B 17/0401 81/3.4 |
| 6,134,992 | A * | 10/2000 | Perkins | B25B 13/32 279/108 |
| 6,240,614 | B1 * | 6/2001 | Kojima | B21J 15/50 29/268 |
| 6,427,336 | B1 | 8/2002 | Kojima et al. | |
| 6,629,804 | B1 * | 10/2003 | Rosenbaum | B23Q 11/0053 408/112 |
| 7,059,216 | B2 * | 6/2006 | Haines, Jr. | B25B 21/002 81/55 |
| 9,056,359 | B1 * | 6/2015 | Clark | B25B 27/18 |
| 9,782,877 | B2 * | 10/2017 | Marquis | B25B 31/00 |
| 2004/0068269 | A1 | 4/2004 | Bonati et al. | |
| 2009/0042164 | A1 | 2/2009 | Machata et al. | |
| 2016/0151101 | A1 * | 6/2016 | Machida | A61B 17/864 606/104 |

* cited by examiner

FASTENING COLLAR REMOVAL APPARATUS, METHODS OF MAKING A FASTENING COLLAR REMOVAL APPARATUS, AND METHODS OF REMOVING A FASTENING COLLAR SECURED TO A FASTENER

FIELD OF USE

The present disclosure relates to fastening collar removal apparatus, methods of making fastening collar removal apparatus, and methods of removing a fastening collar secured to a fastener.

BACKGROUND

Vehicle frames, storage racks, solar panel sub-structures, aircraft parts, and other structures can include numerous mechanical fasteners. For example, a fastener (e.g., a bolt, a structural fastener) can be installed in a bore of a structural component and secured by a fastening collar, such as, for example, a bolt collar and/or a nut. Removing a fastening collar that is secured to a fastener presents challenges.

SUMMARY

In one aspect, a fastening collar removal apparatus is provided. The fastening collar removal apparatus comprises a collet including a first section comprising a substantially cylindrical shape, and a second section operatively coupled to the first section. The second section comprises a collet cavity extending therein. The collet cavity is configured to receive at least a portion of a fastening collar (e.g., a bolt collar and/or a nut) secured to a fastener. The second section comprises at least two fingers formed by at least two axial channels in the second section. At least one of the at least two fingers comprises a blade extending inwardly relative to a longitudinal axis of the collet. In an open configuration of the collet, each of the at least two fingers comprises an outward taper relative to a longitudinal axis of the collet.

In another aspect, a method of making a fastening collar removal apparatus comprises forming a collet in a closed configuration. The collet comprises a first section comprising a substantially cylindrical shape, and a second section operatively coupled to the first section. The second section comprises a collet cavity extending therein. The collet cavity is configured to receive at least a portion of a fastening collar (e.g., a bolt collar and/or a nut) secured to a fastener. The second section comprises at least two fingers formed by at least two axial channels in the second section. At least one of the at least two fingers comprises a blade extending inwardly relative to a longitudinal axis of the collet. A fixture is inserted into the collet cavity to spread apart the fingers, thereby changing the closed configuration of the collet to an open configuration. In the open configuration, each of the at least two fingers comprises an outward taper relative to a longitudinal axis of the collet. The collet is heat treated in the open configuration to create a heat-treated collet, and the fixture is removed from the heat-treated collet.

In yet another aspect, a method for removing a fastening collar secured to a fastener is provided. The method comprises positioning a collet cavity of a fastening collar removal apparatus around a fastening collar secured to a fastener. The fastening collar removal apparatus comprises a collet and an anvil. The collet comprises a first section comprising a substantially cylindrical shape, and a second section operatively coupled to the first section. The second section comprises a collet cavity extending therein. The collet cavity is configured to receive at least a portion of a fastening collar. The second section comprises at least two fingers formed by at least two axial channels in the second section. At least one of the at least two fingers comprises a blade extending inwardly relative to a longitudinal axis of the collet. In an open configuration of the collet, each of the at least two fingers comprises an outward taper relative to a longitudinal axis of the collet. The anvil comprises a first end, a second end, and an anvil cavity extending into the anvil from the first end and configured to receive the collet. The anvil is configured to decrease the outward taper of the at least two fingers in response to forcible contact between the first end of the anvil and the second section of the collet. After positioning the collet cavity of the collet around the fastening collar, the second section of the collet is forcibly contacted with the first end of the anvil, thereby decreasing the taper of the at least two fingers. The fastening collar is deformed by forcible contact with the blade on the at least one of the at least two fingers, thereby enabling removal of the fastening collar from the fastener.

It will be understood that the invention disclosed and described in this specification is not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1A:
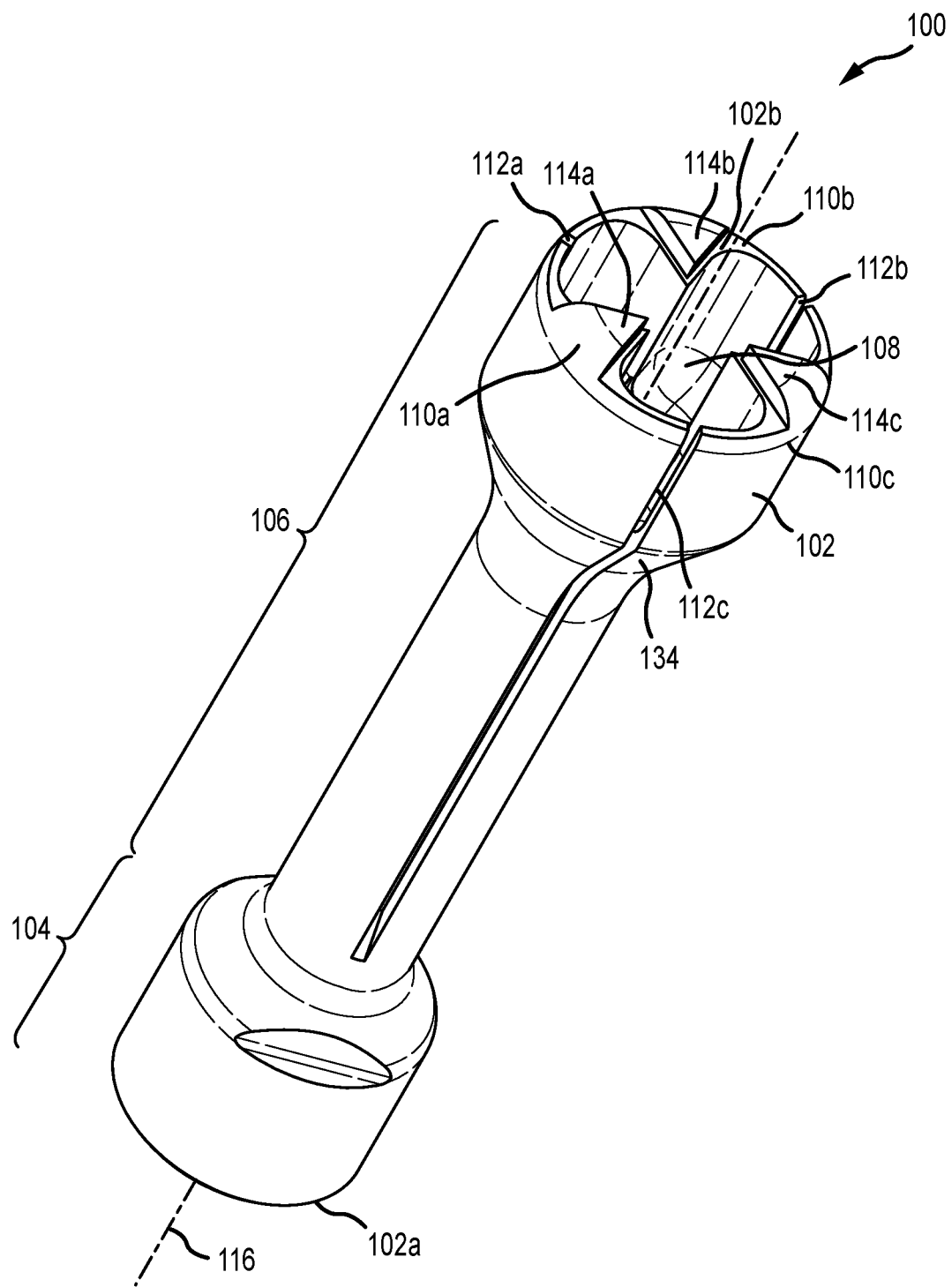
FIG. 1A is a perspective view of a non-limiting embodiment of a fastening collar removal apparatus in a closed configuration according to the present disclosure.

Various examples are described and illustrated herein to provide an overall understanding of the structure, function, and use of the disclosed apparatus and methods. The various examples described and illustrated herein are non-limiting and non-exhaustive. Thus, an invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Removing a fastening collar that is secured to a fastener can be difficult and time consuming. Certain conventional removal tools require a significant amount of side clearance and/or require gripping a shank portion (e.g., pin tail) of a fastener. The present disclosure provides improved fastening collar removal apparatus and methods of making the apparatus. The present disclosure also provides methods of efficiently and effectively removing a fastening collar secured to a fastener. Embodiments of a fastening collar removal apparatus according to the present disclosure may not require significant side clearance and/or gripping the shank portion of the fastener in order to remove a fastening collar secured to the fastener.

Figure 1B:
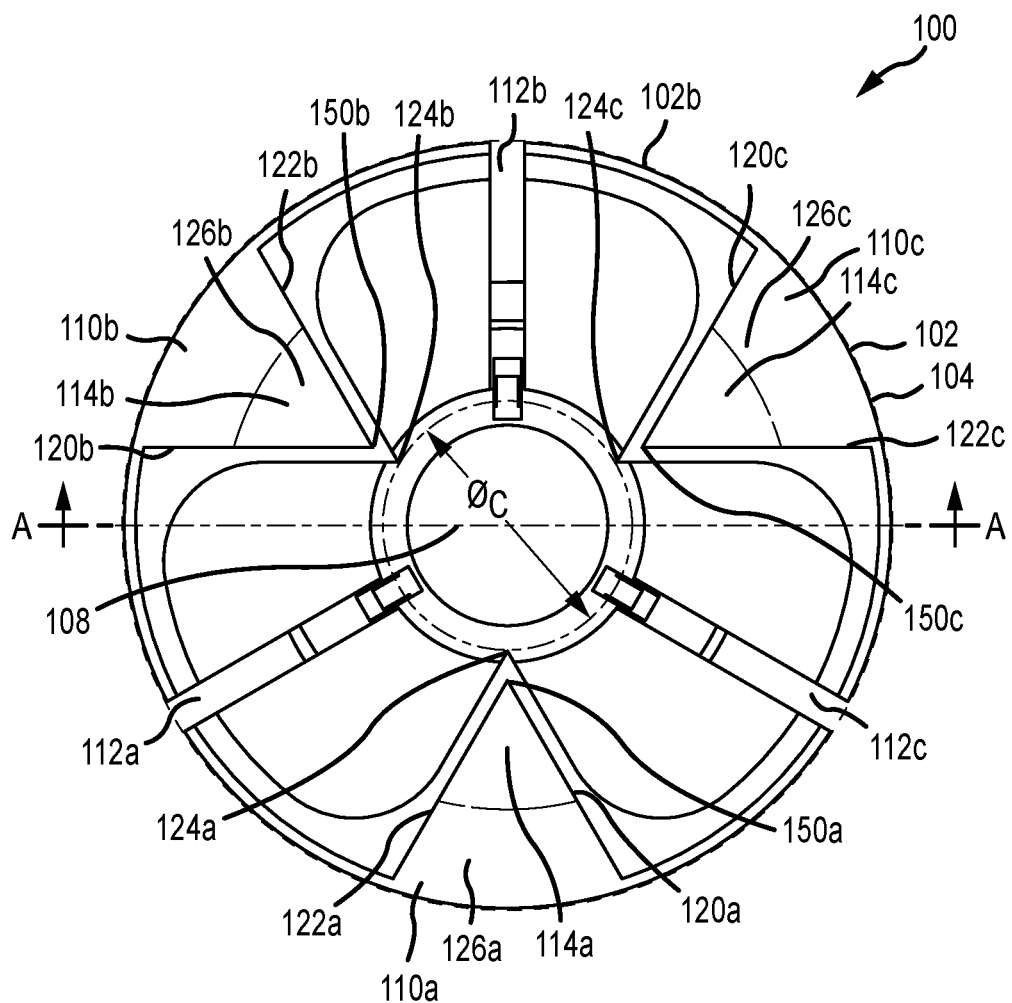
FIG. 1B is a top view of a non-limiting embodiment of the fastening collar removal apparatus of FIG. 1A.
Figure 1C:
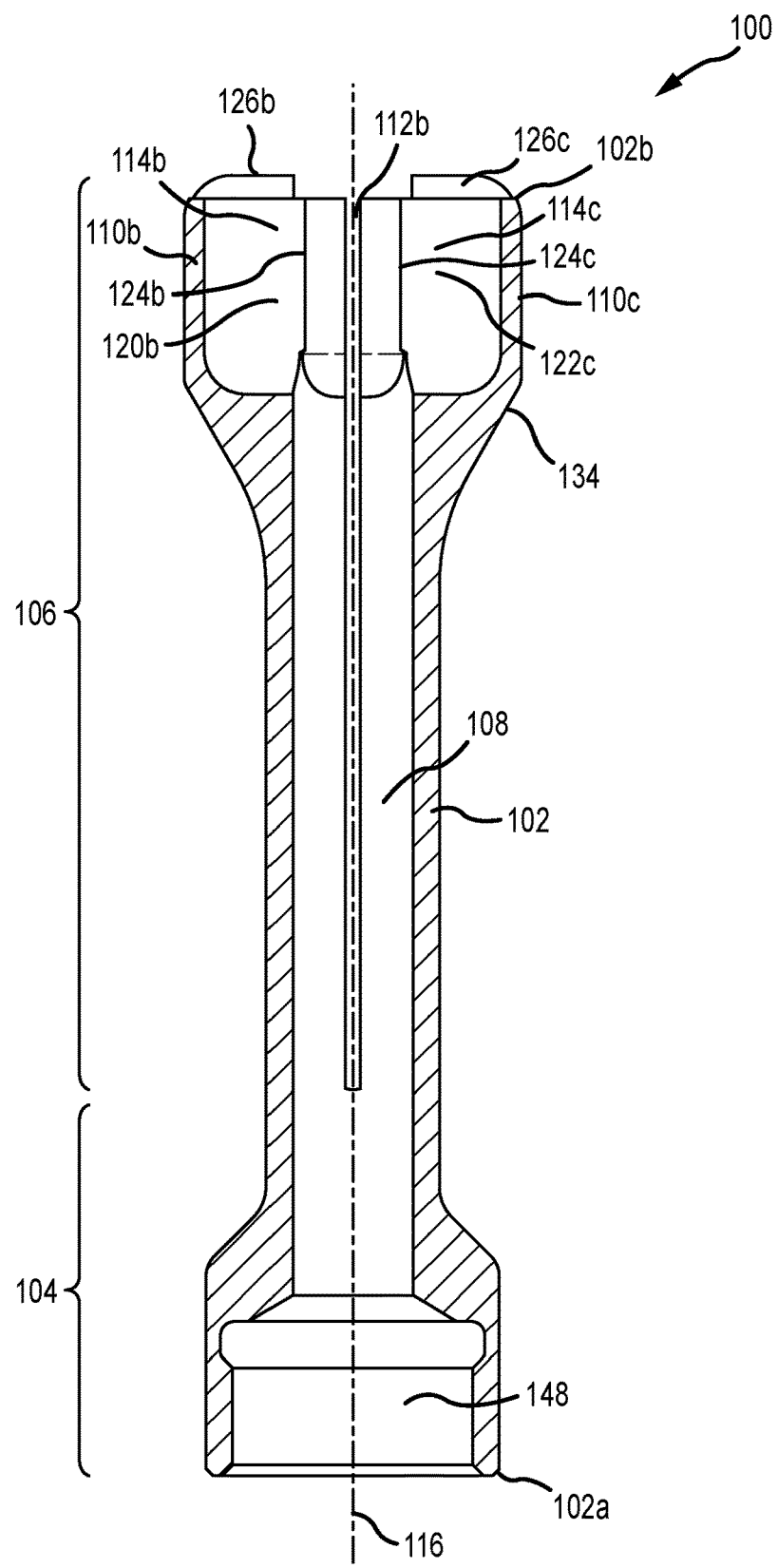
FIG. 1C is a cross-sectional elevational view of the fastening collar removal apparatus of FIG. 1B taken along line A-A.

FIGS. 1A-C illustrate a non-limiting embodiment of fastening collar removal apparatus according to the present disclosure. Fastening collar removal apparatus 100 comprises a collet 102. The collet 102 comprises a first section 104 and a second section 106 operatively coupled to the first section 104. The first section 104 can comprise a substantially cylindrical shape and can comprise a collet cavity 148 extending therein. The first section 104 can be configured to mount to a tool which can generate a linear force, such as, for example, a piston of an installation tool. The installation tool can be a battery-powered tool, such as, for example, at least one of a Huck® Range Force™ Battery installation tool; a pneumatic tool, such as, for example, a Huck® 254 pneumatic tool; and a hydraulic tool, such as, for example, a Huck® SF hydraulic tool, all available from Arconic Fastening Systems Waco, Tex. In various embodiments, the first section 104 can be configured to mount to an adapter.

The second section 106 can comprise a collet cavity 108 extending therein. The collet cavity 108 can be sized and/or configured to receive at least a portion of a fastening collar, such as, for example, a bolt collar and/or a nut. In various examples, the collet cavity 108 can be sized and/or configured to receive a stud of a fastener to which a fastening collar is secured and can enable the stud of the fastener to traverse through the collet cavity 108. The collet cavity 148 and collet cavity 108 can be a continuous collet cavity that can extend from a first end 102*a* of the collet 102 to a second end 102*b* of the collet 102.

The collet 102 can comprise at least two fingers formed by at least two axial channels formed in the collet 102. For example, the collet 102 can comprise fingers 110*a-c* formed by axial channels 112*a-c*. The axial channels 112*a-c* can be substantially parallel to a longitudinal axis 116 of the collet 102. The fingers 110*a-c* can be radially spaced about the longitudinal axis 116 of the collet 102, and in various embodiments, the fingers 110a-c can be substantially equally radially spaced about the longitudinal axis 116 of the collet 102. Equally radially spacing the fingers 110a-c about the longitudinal axis 116 of the collet 102 can facilitate centering the fastening collar within the collet cavity 108 when the fastening collar removal apparatus 100 is in use.

At least one of the fingers 110a-c can comprise a blade extending inwardly relative to the longitudinal axis 116 of the collet 102. For example, as illustrated, each finger 110a-c can comprise a blade 114a-c extending inwardly relative to the longitudinal axis 116 of the collet 102. Each blade 114a-c can comprise two faces, a first face 120a-c and a second face 122a-c respectively. Each first face 120a-c can meet a respective second face 122a-c at an angle in a range of 30 degrees to 90 degrees, such as, for example, 50 degrees to 60 degrees, which can define a respective cutting edge 124a-c. In various embodiments, each cutting edge 124a-c can comprise a flat section configured to prolong the operational life of each respective cutting edge 124a-c.

Each blade 114a-c can comprise a single cutting edge 124a-c, or each blade 114a-c can comprise multiple cutting edges. For example, each blade 114a-c can be stepped. In various embodiments, each blade 114a-c can comprise a stepped blade portion 126a-c defining respective cutting edges 150a-c. Each stepped blade portion 126a-c can be intermediate the remainder of each blade 114a-c and the second end 102b of the collet 102. The stepped blade portions 126a-c can comprise a shape nested within a shape of their respective blade 114a-c. For example, blade 114a can comprise a triangular shape having a first height, and stepped blade portion 126a can comprise a triangular shape having a second height less than the first height.

Figure 2:
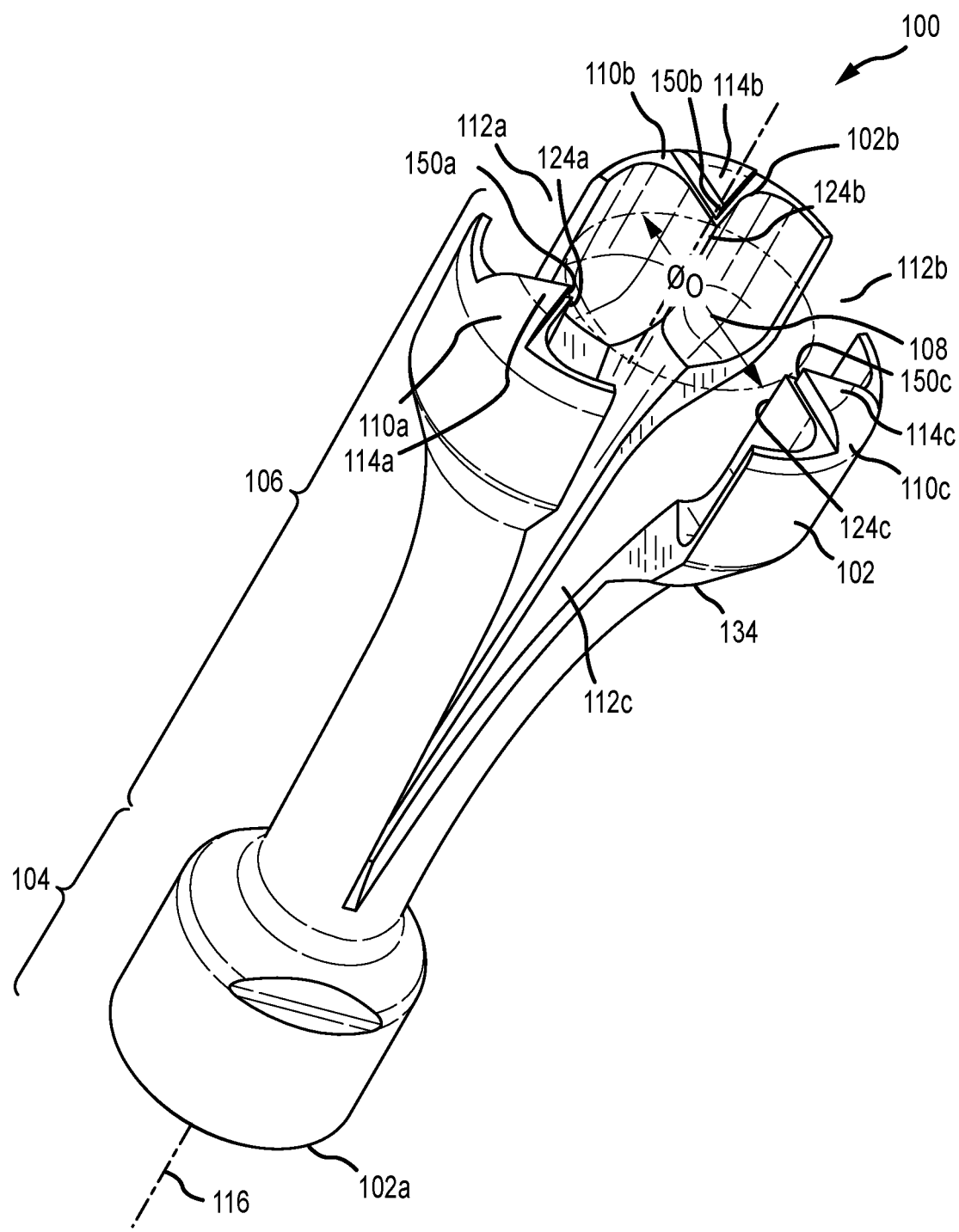
FIG. 2 is a perspective view of the fastening collar removal apparatus of FIG. 1A in an open configuration.

The fingers 110a-c can be flexible and can enable movement of each blade 114a-c relative to one another and toward and away from the longitudinal axis 116 of the collet 102. For example, each finger 110a-c can extend from the first section 104 of the collet 102, and each finger 110a-c can independently move. Each finger 110a-c can be configured in an open position as illustrated in FIG. 2 and can be forcibly contacted to move to a closed position as illustrated in FIGS. 1A-C. When the force is removed, each finger 110a-c can move back to the open position as illustrated in FIG. 2. For example, each finger 110a-c can be configured as a resilient member (e.g., a leaf spring) such that the open position can be a resting position of the resilient member.

Referring to FIG. 2, in an open configuration of the collet 102, including the open position of the fingers 110a-c, each finger 110a-c can comprise an outward taper relative to the longitudinal axis 116 of the collet 102. The blades 114a-c, including cutting edges 124a-c, can define an open diameter, $\varphi_o$, when the fingers 110a-c are in the open position. The open diameter, $\varphi_o$, can be configured to allow a fastening collar to be received in the collet cavity 108 of the collet 102. Thereafter, the fingers 110a-c can be moved to the closed position as illustrated in FIGS. 1A-C, which can change (e.g., decrease) the open diameter, $\varphi_o$, to a closed diameter, $\varphi_c$.

The movement of the blades 114a-c between the open and closed positions can forcibly contact and deform the fastening collar positioned with in the collet cavity 108 of the collet 102. For example, the blades 114a-c can move towards the longitudinal axis 116 of the collet 102 and can at least partially cut into or completely cut through a fastening collar positioned in by the collet cavity 108. The closed diameter, $\varphi_c$, can be adjusted to facilitate applications in which cutting the fastening collar into multiple separate pieces is desired or applications where retaining the fastening collar into the least number of pieces (e.g., a single piece) is desired. In various other embodiments, it may be desired that the fastening collar is still partially retained by a shank section of the fastener but can be removed by a second operation (e.g., pulling). In various embodiments, the closed diameter, $\varphi_c$, can be limited and/or prevented from decreasing to a size where the blades 114a-c can engage a shank portion of the fastener about which the fastening collar is secured. In various other embodiments, the blades 114a-c can engage a shank portion of the fastener about which the fastening collar is secured.

Referring back to FIG. 1C, the fastening collar removal apparatus 100 can comprise a tapered outer surface 134 disposed on the second section 106 of the collet 102. The tapered outer surface 134 can be configured to forcibly contact a tapered inner surface of a second end of an anvil (e.g., a second end 328b of an anvil 328 as shown in FIG. 3B herein). The forcible contact can move the fingers 110a-c and change the location of the blades 114a-c relative to one another. For example, the forcible contact on the tapered outer surface 134 can move the fingers 110a-c towards the longitudinal axis 116 of the collet 102 and can change the configuration of the collet 102 from the open configuration as illustrated in FIG. 2 to the closed configuration as illustrated in FIGS. 1A-C. In various embodiments, the tapered outer surface 134 can be tapered at an angle in a range of 1 degrees to 89 degrees relative to the longitudinal axis 116 of the collet 102, such as, for example, 10 degrees to 60 degrees or 20 degrees to 40 degrees relative to the longitudinal axis 116 of the collet 102.

The collet 102 can comprise at least one of a metal, a metal alloy, and a composite material. In various embodiments, the metal or metal alloy can comprise at least one of aluminum, an aluminum alloy, titanium, a titanium alloy, nickel, a nickel alloy, iron, and an iron alloy. The composite material can comprise, for example, a carbon fiber composite material.

The collet 102 can be manufactured by various processes, such as, for example, at least one of machining, casting, molding, and additive manufacturing. For example, the collet 102 can be machined and then subjected to a secondary process, such as heat treating, in order to configure the collet 102 in the open configuration. In various other embodiments, the collet 102 can be cast in the open configuration. The collet 102 can be a single piece or can include two or more pieces joined together. For example, each finger 110a-c can be joined to the first section 104 of the collet 102 by a secondary process.

Figure 3A:
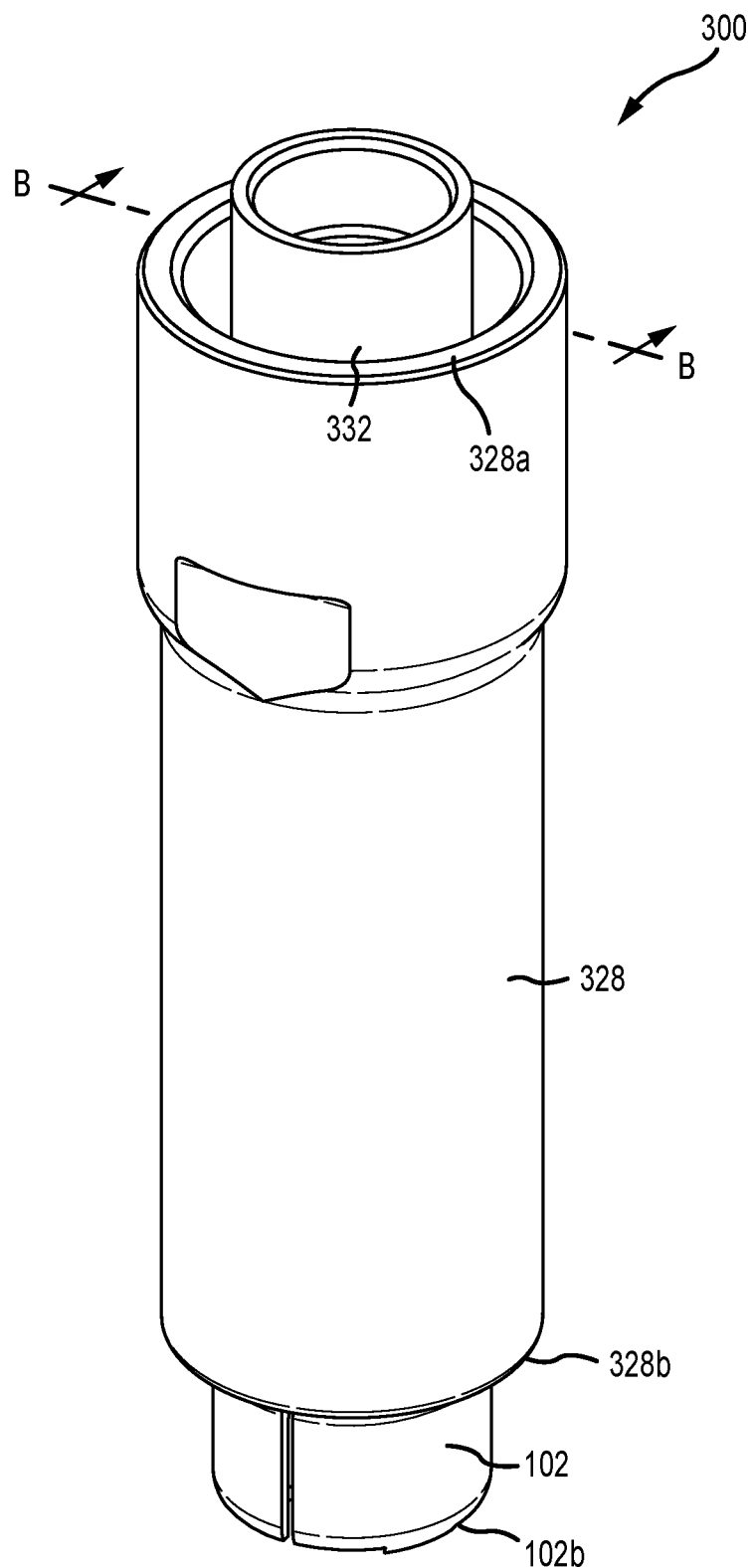
FIG. 3A is a perspective view of a fastening collar removal apparatus comprising a collet and an anvil according to the present disclosure.
Figure 3B:
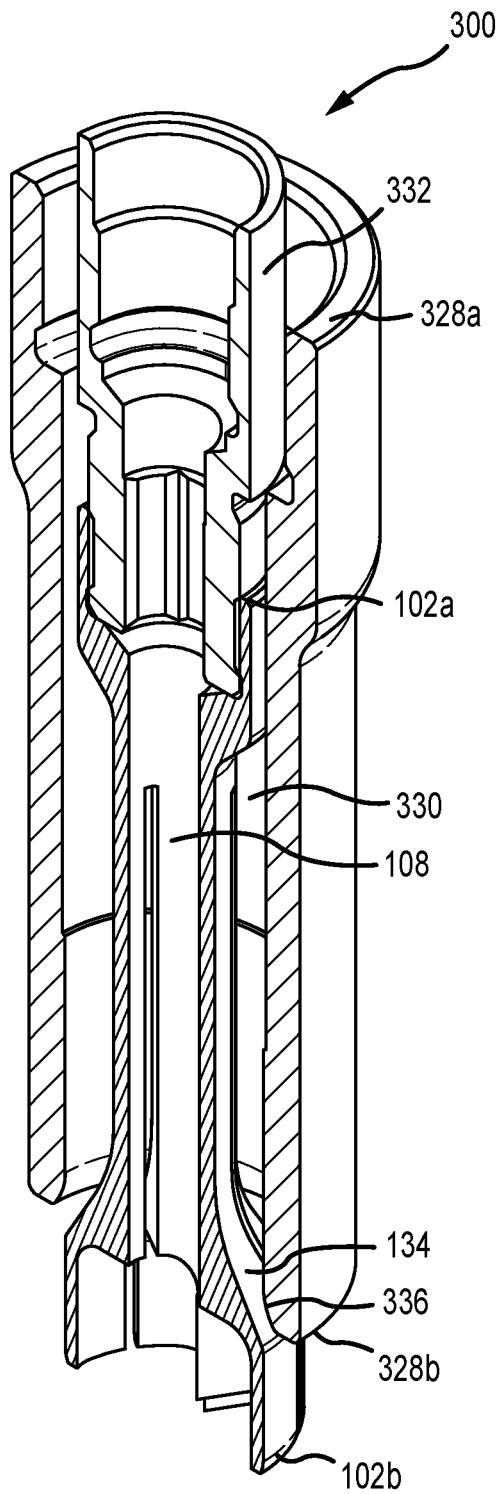
FIG. 3B is a perspective cross-sectional view of the fastening collar removal apparatus of FIG. 3A taken along line B-B.

FIGS. 3A-B illustrate a fastening collar removal apparatus 300 comprising an anvil 328 and a collet 102. The anvil 328 can comprise a first end 328a, a second end 328b, and an anvil cavity 330. The anvil cavity 330 can extend into the anvil 328 from the second end 328b and, in various embodiments, can extend from the second end 328b to the first end 328a of the anvil 328. The anvil cavity 330 can be configured to receive the collet 102.

The anvil 328 can be configured to decrease the outward taper of the fingers 110a-c of the collet 102 responsive to forcible contact between the second end 328b of the anvil 328 and the second section 106 of the collet 102. For example, the anvil 328 can comprise a tapered inner surface 336 disposed on the second end 328b of the anvil 328. In various embodiments, the tapered inner surface 336 can be a radiused inner surface. The tapered outer surface 134 of the second section 106 of the collet 102 can be configured to forcibly contact the tapered inner surface 336 of the second end 328b of the anvil 328. The forcible contact can change the position of the fingers 110a-c from the open position to the closed position. For example, as the collet 102 translates into the anvil cavity 330 of the anvil 328, the open diameter, $\varphi_o$, can decrease. In various embodiments, removal of the forcible contact between the anvil 328 and the collet 102 can move the fingers 110a-c from the closed position to the open position.

In certain embodiments, the collet 102 can be attached to an adapter 332. For example, the adapter 332 can be screwed into the collet or the adapter 332 can be joined in another fashion to the collet 102. The adapter 332 can be configured to operatively couple with an installation tool such that the installation tool can change the position of the adapter 332 and collet 102 relative to the anvil 328.

Figure 4:
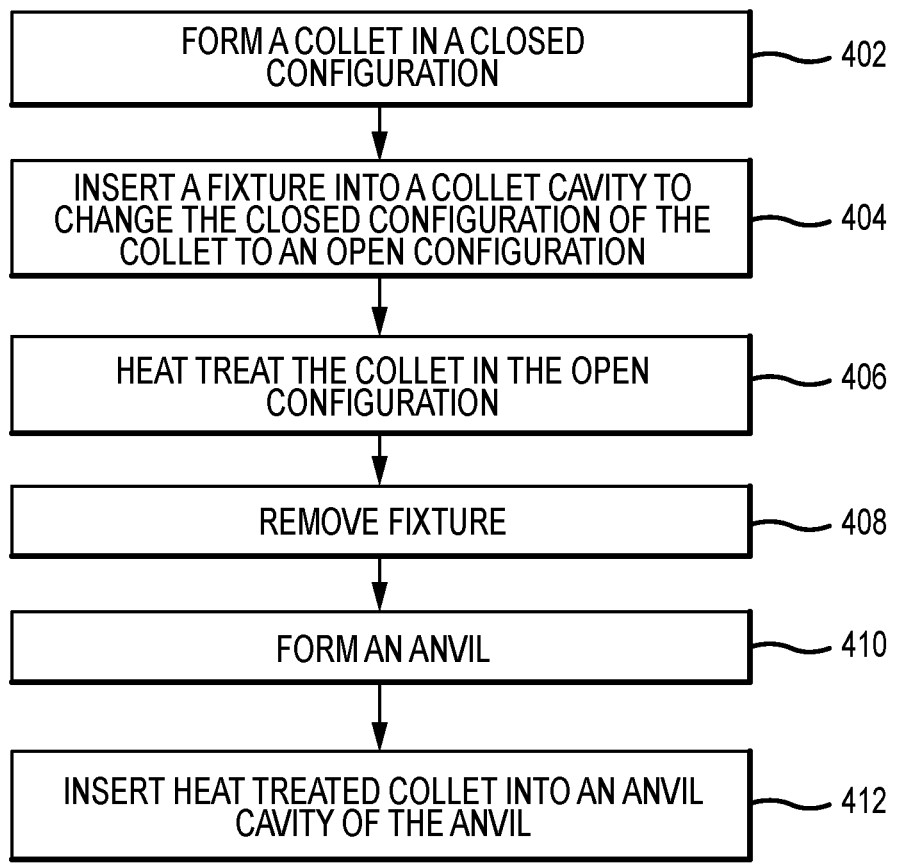
FIG. 4 is a flow chart illustrating a non-limiting embodiment of a method of making a fastening collar removal apparatus according to the present disclosure.

FIG. 4 is a flow chart illustrating an embodiment of a method of making a fastening collar removal apparatus according to the present disclosure, such as, for example, fastening collar removal apparatus 100 and/or fastening collar removal apparatus 300. The method comprises forming a collet, such as collet 102, in a closed configuration, 402. Forming the collet can comprise at least one of machining, casting, molding, and additively manufacturing. In various other examples, the collet can be formed in the open configuration.

In certain embodiments in which the collet is formed in the closed configuration, a fixture can be inserted into the collet cavity of the collet to change the closed configuration of the collet to an open configuration, 404. In various embodiments, the fixture can comprise a substantially conical shape and can be inserted into the collet cavity through the second end of the collet. The fixture can forcibly contact the fingers and position the fingers in the open position. With the fixture positioned in the collet cavity, the collet can be heat treated in the open configuration to create a heat-treated collet, 406. The temperature used for heat treating can be selected depending on the composition of the collet. The fixture can be removed from the heat-treated collet, 408. For example, the fixture can be pulled through the second end of the collet and/or the fixture can be pushed from the first end of the collet out through the second end of the collet. For example, the collet can be knocked out through the second end of the collet using a punch and a hammer. The heat treated collet can retain the open position when the fixture is removed form the heat treated collet.

An anvil, such as anvil 328, can be formed, 410. Forming the anvil can comprise at least one of machining, casting, molding, and additively manufacturing. The heat-treated collet can be inserted into an anvil cavity of the anvil, 412.

Figure 5A:
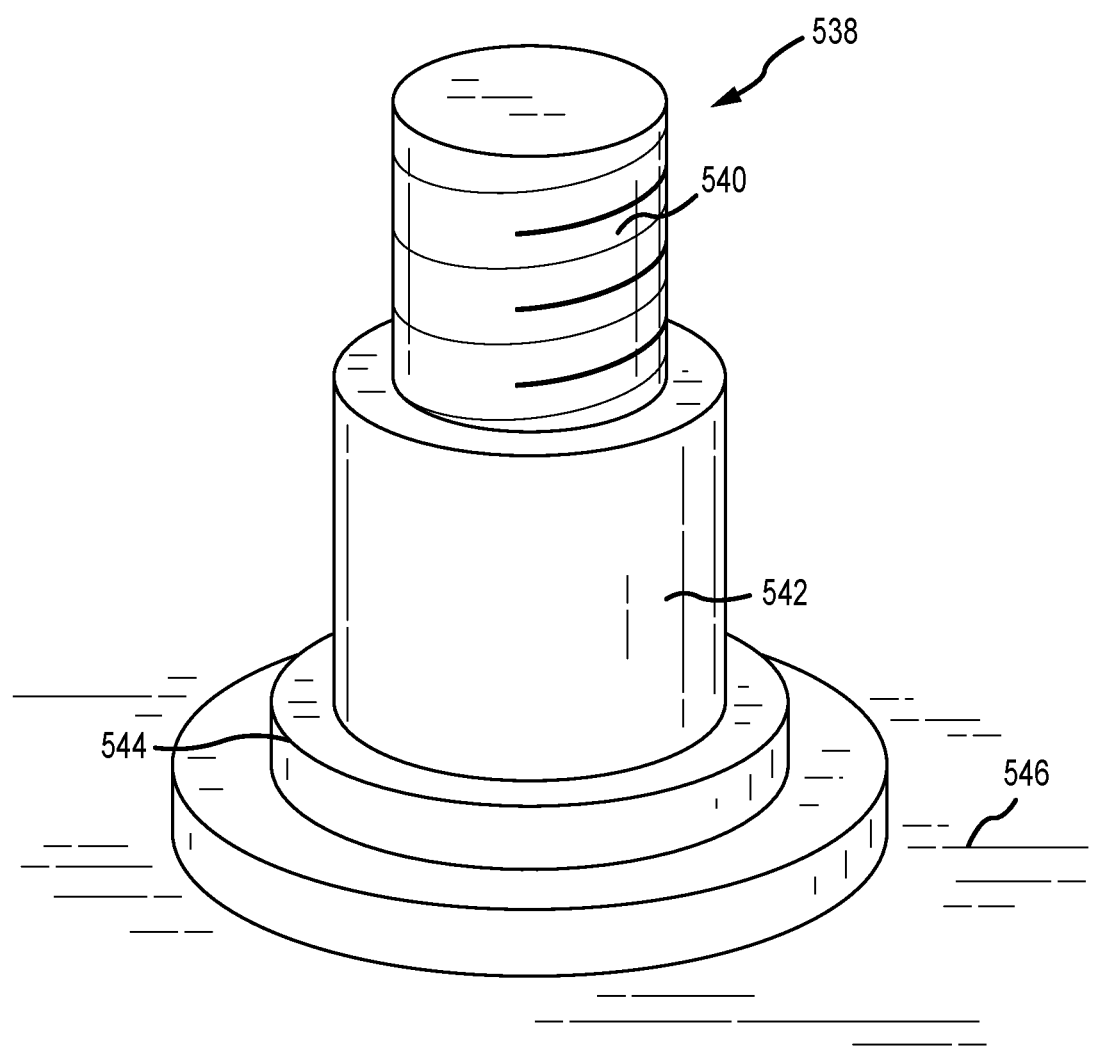
FIG. 5A is a perspective view of a fastening collar secured to a fastener according to the present disclosure.
Figure 5B:
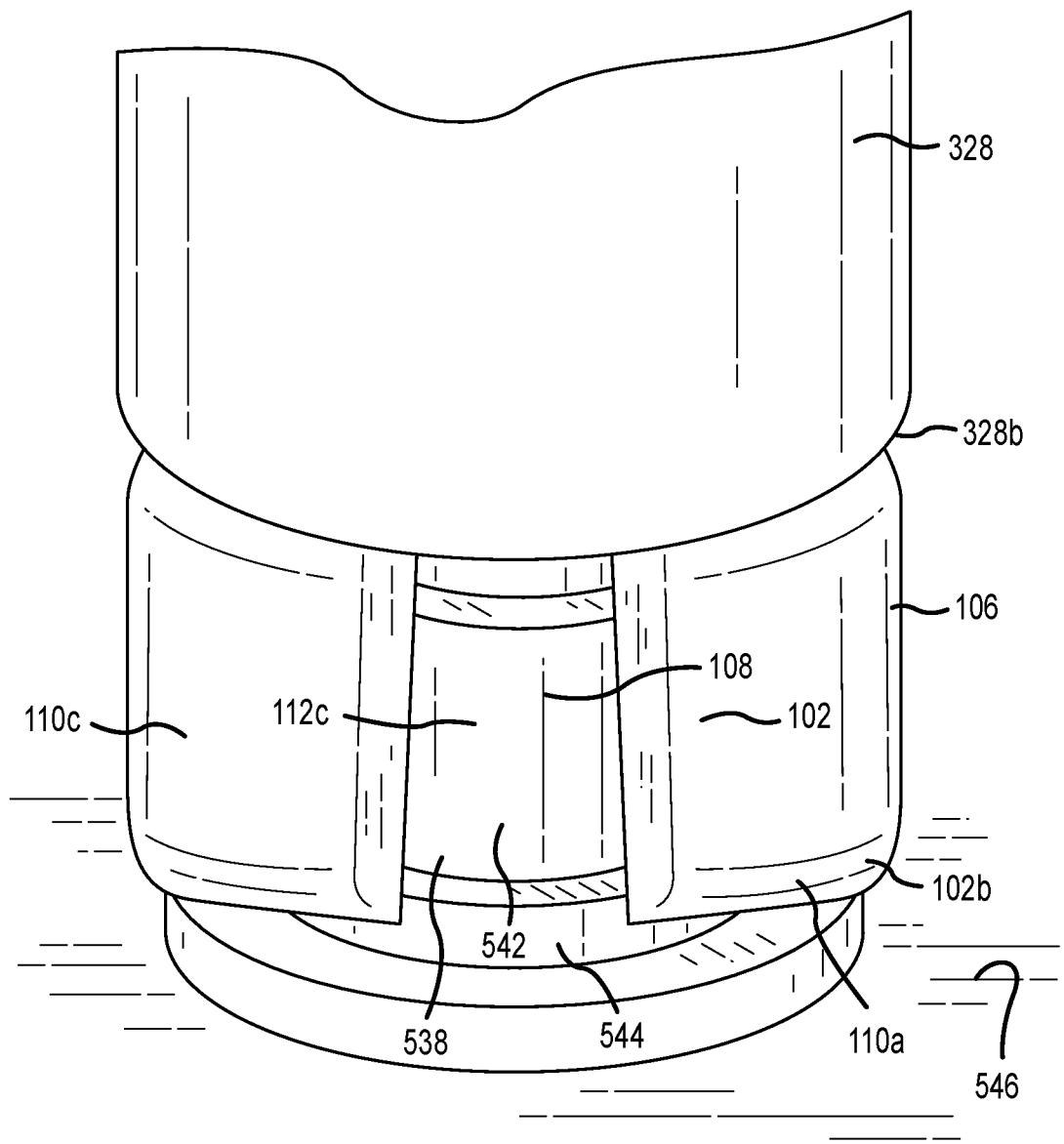
FIG. 5B is a perspective view of a non-limiting embodiment of a fastening collar removal apparatus positioned over the fastening collar of FIG. 5A according to the present disclosure.
Figure 5C:
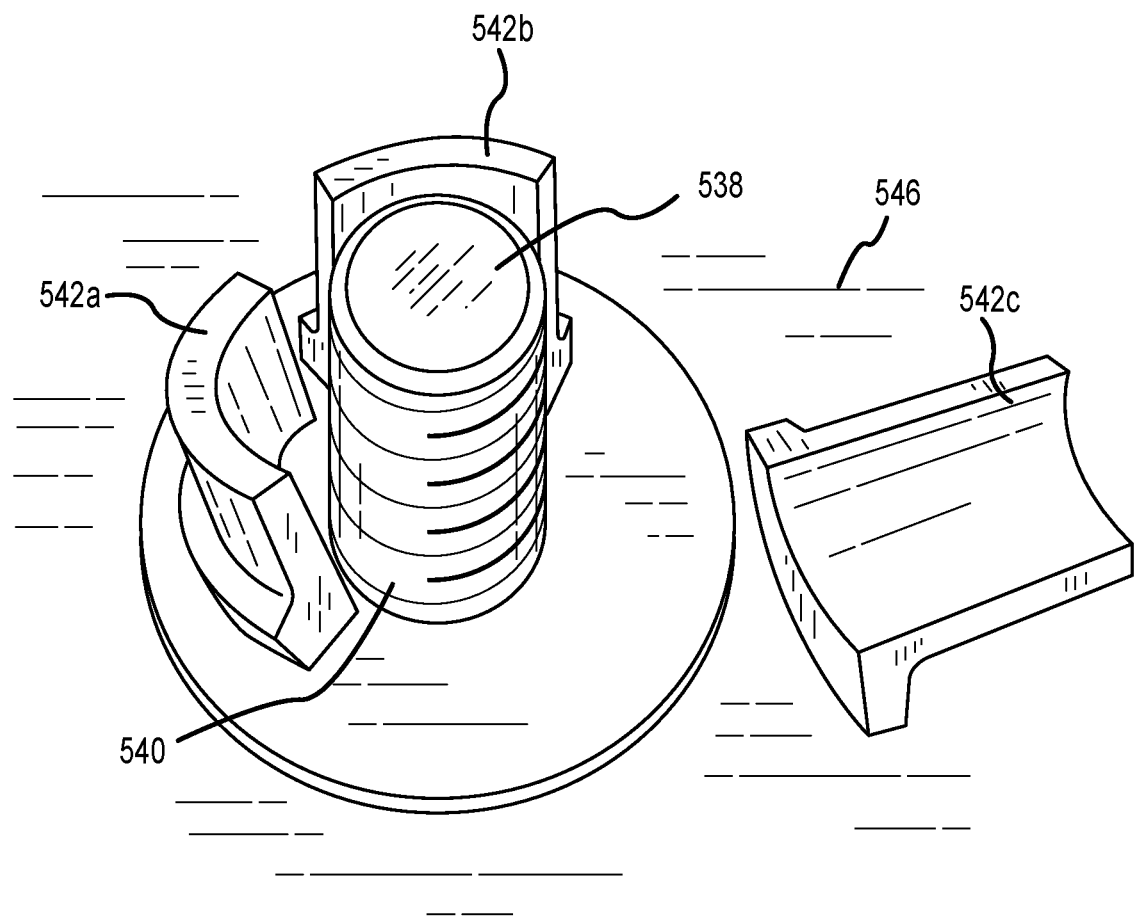
FIG. 5C is a perspective view of the fastening collar of FIG. 5A after having being deformed by action of the fastening collar removal apparatus of FIG. 5B.

FIGS. 5A-C illustrate an embodiment of a method for removing a fastening collar 542 secured to a fastener 538. As illustrated in FIG. 5A, the fastener 538 can comprise a shank portion 540, and the fastening collar 542 is secured to the shank portion 540. The fastener 538 can be secured to a structure 546 by the fastening collar 542. The shank portion 540 can be, for example, a threaded section, a groove section, or a substantially smooth section. The fastener 538 can be, for example, a bolt or a structural fastener. The fastening collar 542 can be, for example, a bolt collar or a nut. The fastening collar 542 can comprise a flange portion 544 which can be integral to the fastening collar 542. The flange portion 544 can comprise a diameter larger than a diameter of the fastening collar 542.

As illustrated in FIG. 5B, the illustrated method for removing the fastening collar 542 comprises positioning the collet cavity 108 of the fastening collar removal apparatus 300 around the fastening collar 542. The shank portion 540 of the fastener 538 also can be received in the collet cavity 108 of the collet 102. The fingers 110a-c of the collet 102 can be configured in the open position to receive the fastening collar 542 and, in various embodiments, a flange portion 544 of the fastening collar 542. The stepped blade portions 126a-c can be substantially aligned with the flange portion 544.

After positioning the fastening collar removal apparatus 300 about the fastening collar 542, the second section 106 of the collet 102 can be forcibly contacted with the second end 328b of the anvil 328 and thereby decrease the outward taper of the fingers 110a-c of the collet 102. Due to the positioning of the stepped blade portions 126a-c, including cutting edges 150a-c, relative to cutting edges 124a-c, the cutting edges 150a-c can engage the flange portion 544 at substantially the same time as the cutting edges 124a-c engage the remainder of the fastening collar 542. Utilizing the stepped blade portions 126a-c can limit, if not prevent, the fastening collar removal apparatus 300 from slipping and/or from otherwise backing off of the fastening collar 542 as the collet 102 changes from the open configuration to the closed configuration.

The fastening collar 542 can be deformed by the blades 114a-c on the fingers 110a-c, thereby enabling removal of the fastening collar 542 from the shank portion 540 of the fastener 538. For example, each blade 114a-c can at least partially cut into or cut completely through the fastening collar 542. As illustrated in FIG. 5C, the blades 114a-c have cut the fastening collar 542 into three pieces 542a-c. In various other embodiments, at least one of blades 114a-c may not cut entirely through the fastening collar 542 and may leave the fastening collar 542 in a single deformed piece that can be removed from the shank portion 540.

Various aspects of the invention include, but are not limited to, the aspects listed in the following numbered clauses.

1. 1. A fastening collar removal apparatus comprising: a collet comprising: a first section comprising a substantially cylindrical shape; and a second section operatively coupled to the first section, the second section comprising: a collet cavity extending therein, wherein the collet cavity is configured to receive at least a portion of a fastening collar secured to a fastener; and at least two fingers formed by at least two axial channels in the second section, wherein at least one of the at least two fingers comprises a blade extending inwardly relative to a longitudinal axis of the collet, wherein in an open configuration of the collet each of the at least two fingers comprises an outward taper relative to a longitudinal axis of the collet.

2. The fastening collar removal apparatus of clause 1, further comprising an anvil comprising: a first end; a second end; and an anvil cavity extending into the anvil from the first end, the anvil cavity configured to receive the collet, the anvil configured to decrease the outward taper of the at least two fingers responsive to forcible contact between the first end of the anvil and the second section of the collet.

3. The fastening collar removal apparatus of clause 2, wherein each finger comprises a blade extending inwardly relative to the longitudinal axis of the collet.

4. The fastening collar removal apparatus of any one of clause 1-3, comprising at least three fingers formed by at least three axial channels in the second section.

5. The fastening collar removal apparatus of clause 4, wherein the three fingers are substantially equally spaced around a circumference of the collet.

6. The fastening collar removal apparatus of any one of clauses 1-5, wherein each blade comprises two faces meeting at an angle in a range of 30 degrees to 90 degrees.
7. The fastening collar removal apparatus of clause 6, wherein each blade comprises two faces meeting at an angle in a range of 50 degrees to 60 degrees.
8. The fastening collar removal apparatus of any one of clauses 6-7, wherein each cutting edge comprises a radius.
9. The fastening collar removal apparatus of any one of clauses 1-8, wherein each blade is stepped.
10. The fastening collar removal apparatus of any one of clauses 1-9, further comprising a tapered outer surface disposed on the second section of the collet and a tapered inner surface disposed on the first end of the anvil, wherein the tapered outer surface of the second section of the collet is configured to forcibly contact the tapered inner surface of the first end of the anvil.
11. The fastening collar removal apparatus of clause 10, wherein the tapered outer surface is tapered at an angle in a range of 20 degrees to 40 degrees relative to the longitudinal axis of the collet.
12. The fastening collar removal apparatus of any one of clauses 1-11, wherein the fastening collar removal apparatus comprises at least one of a metal, a metal alloy, and a composite material.
13. The fastening collar removal apparatus of any one of clauses 1-12, wherein the collet is a single piece.
14. A method of making a fastening collar removal apparatus comprising: forming a collet in a closed configuration, the collet comprising: a first section comprising a substantially cylindrical shape; and a second section operatively coupled to the first section, the second section comprising: a collet cavity extending therein, wherein the collet cavity is configured to receive at least a portion of a fastening collar secured to a fastener; and at least two fingers formed by at least two axial channels in the second section, wherein at least one of the at least two fingers comprises a blade extending inwardly relative to a longitudinal axis of the collet; and inserting a fixture into the collet cavity to spread apart the fingers, thereby changing the closed configuration of the collet to an open configuration, wherein in the open configuration each of the at least two fingers comprises an outward taper relative to a longitudinal axis of the collet; heat treating the collet in the open configuration to create a heat-treated collet; and removing the fixture from the heat-treated collet.
15. The method of clause 14, further comprising forming an anvil comprising a first end, a second end, and an anvil cavity extending into the anvil from the first end and configured to receive the collet, wherein the anvil is configured to decrease the outward taper of the at least two fingers responsive to forcible contact between the first end of the anvil and the second section of the collet.
16. The method of clause 15, further comprising introducing the heat-treated collet into the anvil cavity.
17. The method of any one of clauses 14-16, wherein the collet comprises at least three fingers formed by at least three axial channels in the second section.
18. The method of clause 17, wherein the three fingers are substantially equally spaced around a circumference of the collet.
19. The method of any one of clauses 17-18, wherein each finger comprises a blade extending inward relative to the longitudinal axis of the collet.
20. The method of any one of clauses 14-19, wherein forming the collet comprises at least one of machining, casting, molding, and additively manufacturing.
21. A method for removing a fastening collar secured to a fastener comprising: positioning a collet cavity of a fastening collar removal apparatus around the fastening collar of the fastener, the fastening collar removal apparatus comprising: a collet comprising: a first section comprising a substantially cylindrical shape; and a second section operatively coupled to the first section, the second section comprising: a collet cavity extending therein, wherein the collet cavity is configured to receive at least a portion of the fastening collar; and at least two fingers formed by at least two axial channels in the second section, wherein at least one of the at least two fingers comprises a blade extending inward relative to a longitudinal axis of the collet, wherein in an open configuration of the collet each of the at least two fingers comprises an outward taper relative to a longitudinal axis of the collet; and an anvil comprising a first end, a second end, and an anvil cavity extending into the anvil from the first end and configured to receive the collet, the anvil configured to decrease the outward taper of the at least two fingers responsive to forcible contact between the first end of the anvil and the second section of the collet; after the positioning, forcibly contacting the second section of the collet with the first end of the anvil and thereby decreasing the taper of the at least two fingers; and deforming the fastening collar by forcible contact with the blade on the at least one of the at least two fingers, thereby enabling removal of the fastening collar from the fastener.
22. The method of clause 21, wherein the collet comprises at least three fingers formed by at least three axial channels in the second section.
23. The method of any one of clauses 21-22, wherein the three fingers are substantially equally spaced around a circumference of the collet.
24. The method of any one of clauses 21-23, wherein each finger comprises a blade extending inward relative to the longitudinal axis of the collet.

One skilled in the art will recognize that the herein described fasteners, structures, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:
1. A method of making a fastening collar removal apparatus comprising:
   forming a collet in a closed configuration, the collet comprising:
      a first section comprising a substantially cylindrical shape; and
      a second section operatively coupled to the first section, the second section comprising:

a collet cavity extending therein, wherein the collet cavity is configured to receive at least a portion of a fastening collar secured to a fastener; and at least two fingers formed by at least two axial channels in the second section, wherein at least one of the at least two fingers comprises a blade extending inwardly relative to a longitudinal axis of the collet;

inserting a fixture into the collet cavity to spread apart the fingers, thereby changing the closed configuration of the collet to an open configuration, wherein in the open configuration each of the at least two fingers comprises an outward taper relative to a longitudinal axis of the collet;

heat treating the collet in the open configuration to create a heat-treated collet; and removing the fixture from the heat-treated collet.

2. The method of claim 1, further comprising:
forming an anvil comprising a first end, a second end, and an anvil cavity extending into the anvil from the first end and configured to receive the collet, wherein the anvil is configured to decrease the outward taper of the at least two fingers responsive to forcible contact between the first end of the anvil and the second section of the collet.

3. The method of claim 2, further comprising introducing the heat-treated collet into the anvil cavity.

4. The method claim 1, wherein the collet comprises at least three fingers formed by at least three axial channels in the second section.

5. The method of claim 4, wherein the three fingers are substantially equally spaced around a circumference of the collet.

6. The method of claim 4, wherein each finger comprises a blade extending inward relative to the longitudinal axis of the collet.

7. The method of claim 1, wherein forming the collet comprises at least one of machining, casting, molding, and additively manufacturing.

8. A method for removing a fastening collar secured to a fastener comprising:
positioning a collet cavity of a fastening collar removal apparatus around the fastening collar secured to the fastener, the fastening collar removal apparatus comprising:
a collet comprising:
a first section comprising a substantially cylindrical shape; and
a second section operatively coupled to the first section, the second section comprising:
a collet cavity extending therein, wherein the collet cavity is configured to receive at least a portion of the fastening collar; and
at least two fingers formed by at least two axial channels in the second section, wherein at least one of the at least two fingers comprises a blade extending inward relative to a longitudinal axis of the collet and the blade forming a cutting edge, wherein in an open configuration of the collet each of the at least two fingers comprises an outward taper relative to a longitudinal axis of the collet, wherein the at least two fingers are regions of a single piece of the second section; and
an anvil comprising:
a first end;
a second end;
a tapered inner surface disposed on the first end; and
an anvil cavity extending into the anvil from the first end and configured to receive the collet, the anvil configured to decrease the outward taper of the at least two fingers responsive to forcible contact between the tapered inner surface and the second section of the collet, wherein the tapered outer surface is tapered at an angle of 20 degrees to 40 degrees relative to the longitudinal axis of the collet;

after the positioning, forcibly contacting the second section of the collet with the first end of the anvil and thereby decreasing the taper of the at least two fingers; and deforming the fastening collar by forcible contact with the blade on the at least one of the at least two fingers, thereby enabling removal of the fastening collar from the fastener.

9. The method of claim 8, wherein the collet comprises at least three fingers formed by at least three axial channels in the second section.

10. The method of claim 8, wherein the three fingers are substantially equally spaced around a circumference of the collet.

11. The method of claim 8, wherein each finger comprises a blade extending inward relative to the longitudinal axis of the collet.

12. A fastening collar removal apparatus comprising:
a collet comprising:
a first section comprising a substantially cylindrical shape; and
a second section operatively coupled to the first section, the second section comprising:
a collet cavity extending therein, wherein the collet cavity is configured to receive at least a portion of a fastening collar secured to a fastener;
at least two fingers formed by at least two axial channels in the second section, wherein at least one of the at least two fingers comprises a blade extending inwardly relative to a longitudinal axis of the collet and the blade forming a cutting edge, wherein in an open configuration of the collet each of the at least two fingers comprises an outward taper relative to a longitudinal axis of the collet, and wherein the at least two fingers are regions of a single piece of the second section; and
a tapered outer surface disposed on the second section of the collet; and
an anvil comprising:
a first end;
a second end;
a tapered inner surface disposed on the first end; and
an anvil cavity extending into the anvil from the first end, the anvil cavity configured to receive the collet, the anvil configured to decrease the outward taper of the at least two fingers responsive to forcible contact between the tapered inner surface and the second section of the collet, wherein the tapered outer surface is tapered at an angle of 20 to 40 degrees relative to the longitudinal axis of the collet.

13. The fastening collar removal apparatus of claim 12, wherein each finger comprises a blade extending inwardly relative to the longitudinal axis of the collet.

14. The fastening collar removal apparatus of claim 12, comprising at least three fingers formed by at least three axial channels in the second section.

15. The fastening collar removal apparatus of claim 14, wherein the three fingers are substantially equally spaced around a circumference of the collet.

16. The fastening collar removal apparatus of claim 12, wherein each blade comprises two faces meeting at an angle in a range of 30 degrees to 90 degrees and the two faces forming a cutting edge.

17. The fastening collar removal apparatus of claim 16, wherein each blade comprises two faces meeting at an angle in a range of 50 degrees to 60 degrees.

18. The fastening collar removal apparatus of claim 16, wherein each cutting edge of each blade comprises a radius.

19. The fastening collar removal apparatus of claim 12, wherein each blade is stepped.

20. The fastening collar removal apparatus of claim 12, wherein the fastening collar removal apparatus comprises at least one of a metal, a metal alloy, and a composite material.

21. The fastening collar removal apparatus of claim 12, wherein the collet is a single piece.

* * * * *